3,067,157
CATALYST FOR WATER-SOLUBLE BAKING TYPE RESINS
Arthur G. Hirsch, Dyer, Benjamin A. Bolton, Gary, and Richard E. Van Strien, Griffith, Ind., assignors to Standard Oil Company, Chicago, Ill., a corporation of Indiana
No Drawing. Filed Dec. 14, 1959, Ser. No. 859,096
7 Claims. (Cl. 260—29.2)

This invention relates to water soluble polyester resins characterized by thermosetting properties and particularly such resins containing a catalyst for lowering the thermosetting temperature.

Extremely good quality thermosetting resins made from benzene tricarboxylic acid, aliphatic dicarboxylic acid and aliphatic polyol are now available in water soluble forms. These resins make the best articles and films when baked at temperatures on the order of 400° F. The bulk of present commercial users of baked film protective coatings are equipment limited to operation in the region of 300° F.–350° F. It is therefore the principal object of this invention to provide a resin composition of the above type which possesses thermosetting characteristics at baking temperatures well below 400° F. Other objects will become apparent in the course of the detailed description of the invention.

In the composition of the invention the resinous portion which is soluble in water is in combination with a catalyst which lowers significantly the thermosetting temperature of resinous material. The resin progenitor of the water soluble resinous material consists of the polyester condensation reaction product of a benzene tricarboxylic acid or anhydride and of aliphatic dicarboxylic acid containing at least 4 carbon atoms and an aliphatic polyol. The water soluble resinous product consists of the polyester condensation reaction product resin reacted with an alkaline substance to obtain water solubility at a pH between about 5 and 8. The catalyst utilized in the composition of the invention is a metal in water soluble ionic form which metal is selected from the class consisting of divalent metals and trivalent metals; particularly those metals from Group II and Group III of the Mendeleeff Periodic Table.

The hereinafter defined water soluble resinous product component of the composition of the invention is characterized by the ability to form a thermostat solid upon air-baking at a temperature on the order of 400° F. The presence of the hereinafter defined catalyst in the resinous product enables the production of essentially the same quality thermoset solids (in some instances, better) upon air-baking at temperatures in the region of 325° F. to 350° F.

The catalyst utilized in the composition of the invention is a metal in water soluble ionic form. Broadly, the metal is selected from the class consisting of divalent and trivalent metals. More particularly the metal is selected from the class consisting of Group II and Group III metals of the Periodic Table of Mendeleeff. It is to be understood that water soluble is used herein in the sense of affording sufficient metal in solution to obtain the desired amount of catalytic action at the particular temperature of baking for the particular resinous material used. The halide salts are particularly useful. In many cases the acid form of the metal is particularly useful. Exemplary metals are calcium, barium, zinc, boron, and aluminum.

Sufficient catalyst is present to lower significantly the thermosetting temperature of the resinous product or to attain the desired degree of temperature lowering into the region of 325° F. to 350° F. In general the metal portion of the catalyst is present in said solution in amount between about 0.1 and 2 weight percent based on resinous product; more commonly, from about 0.2 to 1 weight percent. It is to be understood that more or less than this particular amount of catalyst may be used, in part depending upon the particular metal catalyst utilized.

The resin polyester condensation reaction product is prepared by condensing an aliphatic polyol, an aliphatic dicarboxylic acid containing at least 4 carbon atoms, and a benzene tricarboxylic acid at elevated temperatures, for example, about 300°–400° F., while continuously removing the water formed in the reaction. The polyester condensation reaction is well known and it is not necessary to describe it in detail herein. The benzene tricarboxylic acids and anhydrides may also be described as acidic members selected from the class consisting of benzene tricarboxylic acids containing, as the only substituents, 3 carboxyl groups and anhydrides thereof. The individual members of the defined class are trimellitic acid, trimellitic anhydride, trimesic acid, hemimellitic acid and hemimellitic anhydride. Trimellitic anhydride is the preferred acidic member.

The reaction requires the presence of an aliphatic polyol containing two or more hydroxy groups. Any of the well-known aliphatic polyols may be used such as alkylene glycols (including the ether glycols), glycerol, tetrahydroxy alcohols, and hexahydroxy alcohols. Examples of suitable aliphatic polyols are ethylene glycol, propylene glycol, hexamethylene glycol, diethylene glycol, triethylene glycol, glycerol, trimethylolpropane, erythritol, pentaerythritol, dipentaerythritol, mannitol, and sorbitol. The alkylene glycols, and especially the lower glycols (containing 12 or less carbon atoms) are preferred polyols.

The reaction requires the presence of an aliphatic dicarboxylic acid containing at least 4 carbon atoms. Examples of suitable acids are succinic, glutaric, adipic, suberic, sebacic, maleic, itaconic, 1,6-hexene-3-dioic-linoleic-dimer, hexadecanedioic, eicosanedioic, hexacosanodioc and tetratriacontanedioic. The alkandioic acids containing from 4 to about 20 carbon atoms are preferred.

In addition to the defined benzene tribasic acids, the defined aliphatic dicarboxylic acids and the defined aliphatic polyols, the resin polyester condensation reaction product may include an aliphatic monohydroxy alcohol. The aliphatic monohydroxy alcohols include, by way of example, methyl alcohol, butyl alcohol, hexyl alcohol, stearyl alcohol, allyl alcohol, and oleyl alcohol. In addition to the individual compound, mixtures of these monohydroxy alcohols may be used, e.g., the mixtures obtained from the oxoation of a mixture of olefins. Such mixtures of Oxo alcohols are now available commercially and are known as isooctyl alcohol, nonyl alcohol, isodecyl alcohol, and tridecyl alcohol.

The resin polyester condensation reaction product may be obtained by using individual benzene acids or anhydrides, individual aliphatic dicarboxylic acids or individual polyols (and individual monohydroxy alcohols) or a mixture of benzene acids, or acids of polyols (or monohydroxy alcohols).

The characteristics of the resin polyester condensation reaction product is dependent upon the type of reactants, and upon the mole ratios existing among the reactants. In general, the mole ratio of the defined benzene acid to the defined dicarboxylic acid to defined polyol is from about 1:1:2 to 10:1:25. Ratios of reactants outside the spelled out range may be utilized for production of resins having special properties. More usually, the mole ratio of defined benzene acid to defined dicarboxylic acid is between about 2 and 5. When a glycol is used as the polyol, the preferred charge to the polyester condensation zone is calculated on the basis of about 2 moles of glycol per mole of defined benzene acid and about 1 mole of glycol per mole of defined dicarboxylic acid. At the same ratio of reactants, the surface coatings obtainable from the resins may not be of essentially identical characteristics for different reaction systems.

When a monohydroxy alcohol is also present, it is desirable to have a mole ratio of defined polyol to monohydroxy alcohol between 1 and 10. It is to be understood that the amount of monohydroxy alcohol may be less than this amount or more than this amount, dependent upon the desired characteristics of the final product.

The polyester condensation reaction product desirably is prepared under conditions of reaction such that the resin has an acid number the lowest possible commensurate with avoiding gelation. In general, the acid number of the polyester product will be between about 20 and 100. (It is to be understood that not all combinations of the defined reactants can produce an acid number as low as 20, however.) The resin polyester products are soluble in oxygenated solvents such as alcohols and ketones and mixtures of these with benzene hydrocarbons.

The resin polyester condensation reaction products range from very viscous liquids to hard solids in appearance. These polyester products possess the common characteristic of forming "rigid" solids when baked at temperatures on the order of 400° F. in the presence of oxygen or air. The degree of baking (curing) needed to obtain a thermoset material will depend upon the particular polyester product. In general, the products made from trimellitic anhydride, alkandioic acids, and lower glycols form thermoset materials at 400° F. in times ranging from 15 minutes to 1 hour. These polyester resins will cure to thermoset materials at lower temperatures, but require much longer times. An outstanding characteristic of the thermoset solids derived from the polyester products of the invention is the excellent color present in the thermoset solid. Unlike the majority of the presently available commercial materials which form rigid thermoset solids, the color of the polyester product is not significantly degraded by this severe curing at about 400° F. Another outstanding characteristic of the thermoset solids is the glossy surface appearance.

The polyester condensation reaction is carried out in normal fashion. However, the nature of some of the reactants makes it preferable to modify the start-up procedure. It is preferred to have in the reaction zone at least 1 liquid reactant; the liquid reactant may be naturally liquid or liquid at the temperature of the polyester condensation reaction. In the case of a normally liquid reactant, all the reactants are charged into the reaction zone and all reactants brought to the reaction temperature simultaneously. Where all the reactants are normally solid, it is preferred to add the lowest melting reactant to the reaction zone first and produce a liquid material by raising the temperature to the melting point; then the other reactants are introduced and the whole brought to the desired reaction temperature. Also, the reactants may be added in order of melting point in sequence in order to have the material in the reaction zone substantially liquid at all times. It is to be understood that, regardless of the method of addition of the reactants, all of the reactants are, for practical purposes, simultaneously present throughout the reaction (cooking) time.

The water soluble resin consists essentially of the resin produced by the reaction of the polyester condensation reaction product and an alkaline reacting material. The resin product and the alkaline material are reacted until a water soluble resinous product is obtained. The amount of alkaline reacting material is most readily determined by following the pH of the reaction medium. An aqueous reaction medium is preferred when the water soluble resinous product is to be used for surface coating applications because the desired water solution is obtained immediately. When the resin product and aqueous reaction medium are contacted in the presence of an alkaline reacting material, the resinous product passes into solution substantially completely at a pH of about 5. In practically all instances, the resinous product will be in complete solution at a pH of about 6. The use of alkaline reacting material in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amine aliphatic alcohols, such as ethanolamines, are suitable. The heteroamines, such as morpholine, pyridine, and piperdine may be used. The type of alkaline reacting material used is determined in part by the characteristic desired in the final water soluble resin; also, by the type of resin product which is to be converted to a water soluble form. Preferred materials are aqueous ammonia, and the lower molecular weight amines, such as ethylamines and butylamines and morpholine and ethanolamines.

The neutralization reaction is carried out by contacting the resin product and the alkaline reacting medium, when necessary in the presence of a liquid reaction medium; particularly suitable reaction mediums are oxygenated organic solvents and water. When water is used as the liquid reaction medium, it is preferred that it be warm, i.e., maintained in the region of 100–160° F.; the resin product is added to the aqueous alkaline reaction material and the two agitated until the resinous product has passed into solution. Ammonium hydroxide solution is a particularly suitable aqueous alkaline medium. The water solutions of the water soluble resinous products are clear liquid usually containing some opalescent appearance; the solutions may be colorless or colored, depending on the particular water soluble resin present.

The water soluble resinous product behaves in essentially the same manner as the resin product when exposed to oxygen or air at elevated temperatures in that an air-baked or cured thermoset solid is formed. At temperatures on the order of 400° F., the water soluble resin produces hard films on metal surfaces in times of 15 minutes to 1 hour. An outstanding characteristic of the products is that the water soluble resins possess essentially the identical thermosetting properties that the water insoluble polyester resin product progenitors possess. Surprisingly, the films produced from the water solutions possess the same very high gloss that the films produced from the solvent solutions of polyester products possess; this gloss is particularly apparent in the presence of pigments where enamel finishes are obtained.

In addition to their high solubility, which may be as much or more than 50 percent by weight, the water soluble resins are also soluble in the ordinary oxygenated organic solvents as well as immixtures of these with benzene hydrocarbons. Because of its cheapness and safety, water is the preferred solution for surface coating applications and also as an aqueous reaction medium.

The water soluble composition of the invention consists essentially of the above defined water soluble resinous reaction product and an amount of the defined catalyst sufficient to lower significantly the thermosetting temperature of the resinous product. Usually the catalyst is present in an amount of about 0.1 to 2 weight percent based on the resinous product. The catalyst may be introduced directly or may be dissolved into a water or aqueous solution of the resinous material. Best results in the addition of the metal to the resinous product are obtained by more or less continuously adjusting the pH of the solution at about 6. Upon the completion of the addition of the metal, the composition may be adjusted to the broad range of 5–8 and more preferably the range of 6–7. When the water or aqueous solution is evaporated, the catalyst remains with the film of resinous material and performs its thermosetting temperature reducing function.

The water soluble composition may be recovered from the reaction medium and used for the preparation of thermoset solids. The compositions of the invention have utility in the broad field of rigid plastics now occupied by materials such as phenol formaldehyde resins and filled melamine-formaldehyde resins. They may also be used as binders for laminations such as plywood forming and fiber glass reinforced plastics. In both of these uses, the compositions of the invention are particularly good because no curing agent need be added in order to obtain good rigidity or suitably short curing times. For surface coating purposes, the solid water soluble composition is preferably dissolved in a sufficient amount of water to produce the desired viscosity for the particular application.

The benefits of the hereinabove defined catalyst in the defined resinous material are illustrated by the following which do not limit the scope of the invention.

Resin was prepared from trimellitic anhydride, adipic acid, and propylene glycol in a mole ratio of 3:1:7. The reactants were raised to 352° F. and cooked for a period of 7 hours with a sparge of nitrogen gas; water of reaction was condensed and removed. The polyester resin product was a clear, yellowish solid with an acid number (mg. KOH/g.) of 52. The solid resin was dissolved in a 60:40 (by volume) mixture of xylene and butanol to obtain a 50% solution, i.e., 1 part by weight of resin for 1 part by weight of solvent.

Resin prepared as above was converted to the water soluble form by treatment with ammonium hydroxide to obtain a water solution with a pH of about 6.

A 30% solution of the above resin in water was used as the composition undergoing test. Five solutions were used, namely, one solution with no catalyst and 4 with metal chlorides present as catalysts. The catalysts were aluminum chloride, barium chloride, calcium chloride, and zinc chloride respectively. Each catalyst containing solution was prepared by adding the particular metal chloride to the water solution of resin with vigorous stirring. An opaque precipitate developed at each addition but the precipitate redissolved when the pH of the solution was adjusted to about 7 with ammonium hydroxide. Solution containing various amounts of the catalyst were prepared. Metal panels were coated uniformly with each test composition and the blank composition. The panels were then baked in an oven for 30 minutes at 350° F. In each of these instants the cured film thickness was very close to 1.1 mil. The cured panels were then subjected to flexibility tests by bending on a 1/8" mandrel, impact resistance (inch-lbs.) and caustic resistance to 2% sodium hydroxide solution. In each case the amount of metal ion present was calculated and is set out based on the resins present in the composition. The results of these tests are set out in Table 1 below.

Table 1

ALUMINUM CHLORIDE

| Percent Metal Added—Based on Resin Solids | Resistance to 2% NaOH Sol'n (minutes) | Flexibility (1/8"Mandrel) | Impact-Resistance (inch-pounds) |
| --- | --- | --- | --- |
| None | <30 | Fail | <10 |
| .034 | <30 | Fail | <10 |
| .05 | 240 | Pass | 10–20 |
| .10 | 210 | Pass | 20–40 |
| .20 | 180 | Pass | 40–60 |

BARIUM CHLORIDE

| | | | |
| --- | --- | --- | --- |
| None | <30 | Fail | <10 |
| .66 | 360 | Pass | 40–60 |
| .99 | 90–120 | Pass | 20 |

CALCIUM CHLORIDE

| | | | |
| --- | --- | --- | --- |
| None | <30 | Fail | <10 |
| .06 | <30 | Pass | 10 |
| .18 | 120 | Pass | 20–40 |

ZINC CHLORIDE

| | | | |
| --- | --- | --- | --- |
| None | <30 | Fail | <10 |
| .12 | 360 | Pass | 20–40 |
| .72 | 150 | Pass | 20–40 |

The above tests clearly show the large improvement in physical properties of the baked films when the defined metal catalyst is present. Some improvement in properties such as alkali resistance is obtainable even at 400° F. over the un-catalyzed film. However, at 400° F. a highly set film is obtained from the defined resinous materials even without catalyst.

These metal additions form stable dispersion with the resin in question at pH's of 6–9 and no settling of aluminum or zinc has been noted in a month's time, as would be expected if these metals were merely dispersed in the resin solutions at pH's above 7. The solubility of $Al(OH)_3$ is .000104 part in 100 parts of water at 18° C., and the solubility of $Zn(OH)_2$ is .00052 part in 100 parts of water at 18° C.

Another test was carried out using boric acid as the catalyst. The boric acid was added to 30% water solution of the resin defined in the previous examples. It was observed that during the addition of the boric acid there was no precipitation of solids which is undoubtedly due to the fact that this week acid would not significantly change the pH of the water solution. Panels were prepared and baked at 350° F. for 30 minutes. In this instance the baked films had a thickness of about 0.7 mil. The results of these tests using boric acid as a catalyst are set out in Table 2 below.

Table 2

| Percent Boron Added (Based on Solids) | Flexibility (1/8" Mandrel) | Impact-Resistance (inch-pounds) |
| --- | --- | --- |
| None | Fail | <10 |
| .08 | Pass | 10–20 |
| .17 | Pass | 10–20 |
| .34 | Pass | 10–20 |

Thus having described the invention what is claimed is:

1. An aqueous solution of resinous reaction product of reactants consisting essentially of (1) the polyester condensation reaction product of (a) benzene tricarboxylic acidic member selected from the group consisting of trimellitic acid, trimellitic anhydride, trimesic acid, hemimellitic acid and hemimellitic anhydride, (b) alkandioic acid having from 4 to about 20 carbon atoms, and (c) an alkylene glycol having less than 12 carbon atoms, where the mole ratio of tricarboxylic acidic member:alkandioic member:glycol is between about 1:1:2 and 10:1:25, said reaction being continued until the product has an acid number between about 20 and about 100, which product is characterized by the formation of a thermoset solid upon air-baking at a temperature on the order of 400° F., with (2) an alkaline substance selected from the class consisting of ammonia, lower molecular weight alkyl amines, amine aliphatic alcohols, and heterocyclic amines, said (1) and (2) being reacted in a water medium whereby an aqueous solution of resinous reaction product is obtained, said aqueous solution being characterized by a pH of between about 5 and 8 and (3) dissolved in said solution, a water soluble metal ion affording compound in an amount such that between about 0.1 and 2 weight percent, based on said resinous reaction product, of said metal ion is present, and said metal being selected from the class consisting of aluminum, barium, boron, calcium, and zinc.

2. The solution of claim 1 wherein said metal is aluminum.

3. The solution of claim 1 wherein said metal is zinc.

4. The solution of claim 1 wherein said alkaline substance is ammonia.

5. The solution of claim 1 wherein said tricarboxylic acidic member is trimellitic anhydride.

6. The solution of claim 1 wherein said alkandioic member is adipic acid.

7. The solution of claim 1 wherein said glycol is propylene glycol.

References Cited in the file of this patent

UNITED STATES PATENTS

| | | |
|---|---|---|
| 1,998,744 | Ubben | Apr. 23, 1935 |
| 2,562,878 | Blair | Aug. 7, 1951 |